E. Buel,
Hay Press.
No. 89,022. Patented Apr. 20, 1869.

Witnesses.

Inventor.
E. Buel

E. Buel,

Hay Press.

No. 89,022. Patented Apr. 20, 1869.

Witnesses.
Wm H Dennis
J. A. Connolly

Inventor.
E Buel

UNITED STATES PATENT OFFICE.

EBENEZER BUEL, OF SILVER CREEK, NEW YORK.

*Letters Patent No. 89,022, dated April 20, 1869.*

IMPROVED PRESS FOR BALING HAY AND COTTON.

The Schedule referred to in these Letters Patent and making part of the same.

*To all whom it may concern:*

Be it known that I, EBENEZER BUEL, of Silver Creek, in the county of Chautauqua, in the State of New York, have invented a new and useful Improvement in Apparatus for Pressing, Baling, Sacking, and Packing purposes; and I do hereby declare the following to be a full, clear, and exact description of the construction and operation of the same, reference being had to the accompanying drawings, and the letters of reference marked thereon.

Figure 1:
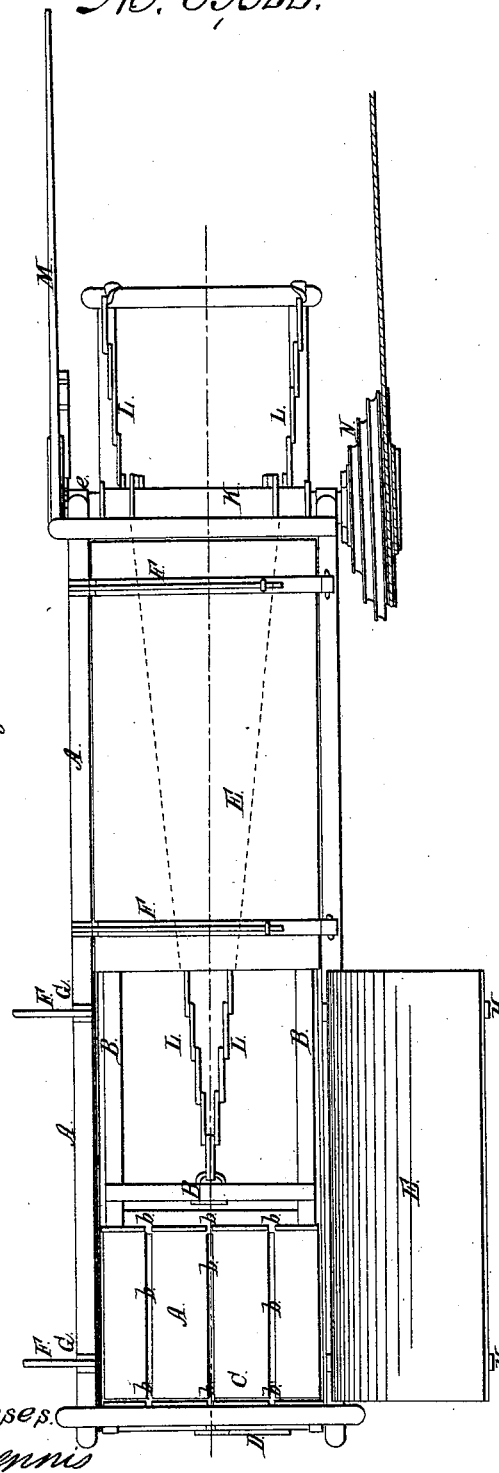
Figure 1 is a top view, with one of the doors open, as in tying the bale; the other closed, showing the manner of fastening the same; also, the position of the parts.
Figure 2:
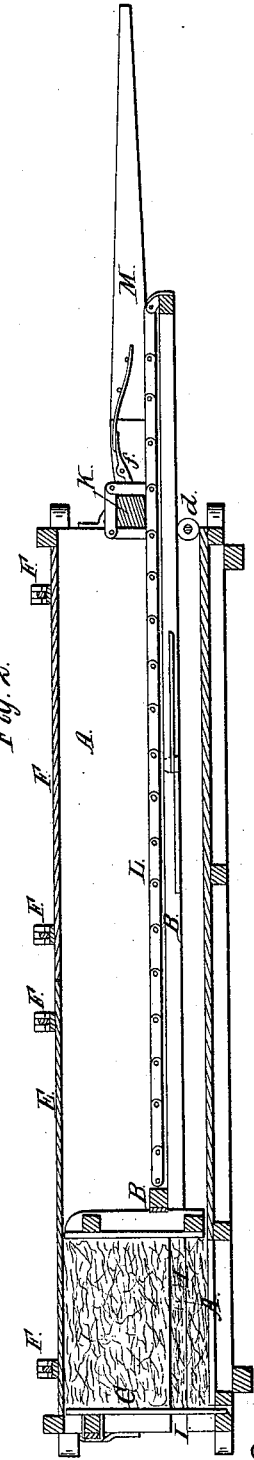
Figure 2 is a vertical section.
Figure 5:
Figure 5 shows the shape of the cam-headed lever and hook, for fastening the doors down.
Figure 4:
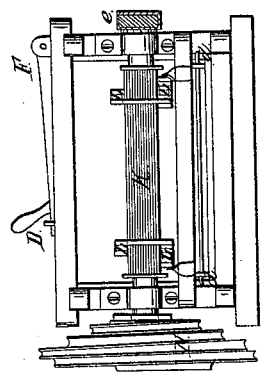
Figure 4 is an end view.
Figure 3:
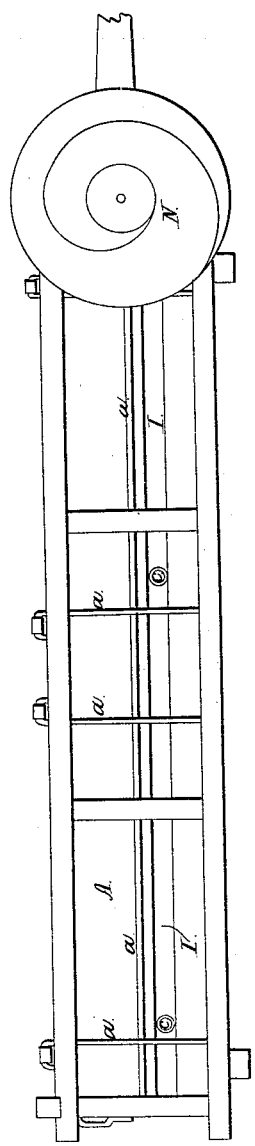
Figure 3 is a side elevation.

The nature of my invention consists in providing an apparatus for conveniently compressing hay, straw, cotton, wool, hemp, and flax-lint, broom-corn, hops, and other bulky materials into bundles, bales, sacks, or boxes, that it may be handled, stored, and transported with greater convenience.

To enable others skilled in the art to make and use my invention, I will proceed to describe its construction and operation.

A A A represent a box-curb, or crib, securely framed together and strengthened by means of rods *a a*, extending longitudinally and transversely through the sides and bottom, and lined on the sides and bottom, within, with plank of any strong timber, and of a size to correspond with the use for which it is specifically designed, as a larger one is required for baling hay, straw, &c., than for sacking cotton, wool, &c.

The rear end of the crib is left open for the passage of the follower B.

The front end is provided with a gate, C, or door, so constructed and hinged to the sills of the crib as to be let down into a horizontal position, level with the bottom of the crib, to allow the bale to pass out of the press, after it has been tied, without obstruction. It is fastened into place by means of bars at the top, which pass into hooks made fast to the front end of the crib.

These bars are operated by means of the lever D, to which one end of each is pivoted.

The gate is constructed with three slots or grooves, *b*, for receiving the hoop, cord, or wire, for tying the bundle, which grooves are also continued around the bottom and back side of the bale, by means of slots in the lining of the bottom of the crib and face of the follower.

The crib is provided with a top, or door, E, in two sections, for the convenience of operation, which are hinged securely to one side of the crib at the top, and forced down and held in position by means of levers fastened to the side of the crib, opposite the hinges.

These levers F are constructed with a cam-shaped head and a hook, G, which fastens upon a hook, H, on the end of the door-hinge, and serves the double purpose of keeping the door down into place, and preventing a lateral spreading of the sides of the crib.

This cam-shape of the head of the lever also brings the hooks on the lever and lid in contact, before the door is forced down fully into position, and corrects any springing that may have taken place in packing the material to be pressed into the box, and when not in use, enables the levers to fall in a vertical position by the side of the crib, out of the way of the operators.

The crib is further made with two slots running the entire length of the sides I, near the bottom, made by leaving the lining-plank apart a sufficient space for the purpose of receiving friction-rollers *c* on the sides of the follower, which makes it work freely, and prevents the timbers from springing.

The follower B is made of such form as to run on the rollers *d*, under the shaft *k*, and allow the rollers *c*, on the sides of it, to work in the slots in the side of the crib.

To each end of this follower is attached the end of two chains, L, which pass around the shaft *k*, and cause the follower to move in the direction toward which the bottom of the shaft is made to revolve.

These chains are made of links of lengths to correspond to the size of the sides of the angles of the shaft, and so riveted together, (each link being consecutively placed on the right or left side of the chain, respectively as it is designed for the right or left-hand side of the machine,) as to make the chain wind upon the shaft spirally, thus traversing from a point near the centre, the weakest in the shaft, at the time when the follower is fully withdrawn, to the rear of the crib, when resistance is least, to a point near the bearings of the shaft, when the follower is forced home to the point of greatest resistance, where the bale is tied.

The shaft is of iron, and may be square, or of any desired angular form, or even round, in which case, however, the chains must be attached to the shaft in the centre, and wind around it, and a smaller chain attached to the head of the follower to draw it back into the place for filling the box.

Each end of the shaft is provided with a ratchet-wheel, *e*, which is acted upon by a pawl, *f*, on the lever M, and turns the shaft, which forces the follower forward into the press. To withdraw the follower, the pawls are thrown off the ratchet, when it may be drawn back without resistance.

When more power is required than is practicable to obtain by the use of the levers, by hand, they are removed, and a double spiral-wheel, or fusee, M, is put in place of one of them, around which a cable is passed, and thence to a capstan, or other power, as may be desired.

The effect of this double fusee is to gain time, when horse-power is used, as the motion is increased thereby at those points where resistance is less, and decreased where more power is required, until, at the point where the bale is tied, the full power of the wheel is exerted; and when, after the bale is tied, the follower is again driven forward to expel the bale, or to force it into the sack, or box, the speed is again increased, by means of the fusee on the other side of the wheel.

It will be readily seen that the labor of filling this machine with hay, or other material to be pressed, is reduced to the minimum, by reason of its low horizontal position.

The gate at the front end being barred, and the doors pressed and barred down, by means of the levers F, the operation of pressing is performed by revolving the shaft, by means of the levers M, or the wheel N, forcing the follower forward to a point where the material is compressed to the desired density, when it is bound, and the gate is let down, and the follower again propelled, and the bale is forced out of the crib.

To put the bundle into a sack, after tying, the gate is let down, and a sack, fastened by temple-hooks over the mouth of the press, the follower withdrawn sufficiently to allow the piece to form the end of the sack, to be spread upon the face of the follower, then, by running the follower forward, the bundle is lodged in the sack, and the end sewed up.

Boxing is done in a similar manner.

1. I claim the angular shaft K and the chain L, when constructed and combined in the manner specified.

2. I claim the levers F, with their hooks G and H, which form the device for locking the doors, or lids, when made and used substantially as described.

3. I also claim, in combination with the box A and follower B, and the friction-rollers $c\ c$ and $d\ d$, and the ratchets $e$, and the pawl $f$, and the lever M, the double-fusee wheel N.

EBENEZER BUEL.

Witnesses:
    THOS. A. CONNOLLY,
    WM. DENNIS.